US005293715A

United States Patent [19]

Kaz

[11] Patent Number: 5,293,715

[45] Date of Patent: Mar. 15, 1994

[54] REVERSIBLE DUAL-PURPOSE SELF-STANDING POT COVER

[76] Inventor: Rita Kaz, 6120 Radford Ave., North Hollywood, Calif. 91606

[21] Appl. No.: 986,081

[22] Filed: Dec. 4, 1992

[51] Int. Cl.[5] .............................................. A01G 9/02

[52] U.S. Cl. .......................................... 47/72; 40/324; 206/423

[58] Field of Search .............. 47/72; 206/459.1, 459.5, 206/423, 575; 40/310, 324

[56] References Cited

U.S. PATENT DOCUMENTS

| | | | |
|---|---|---|---|
| 265,836 | 10/1882 | Lindner | 47/72 |
| 1,036,588 | 8/1912 | Eastburn | 40/310 |
| 1,298,992 | 4/1919 | Merklee et al. | 40/310 |
| 1,446,563 | 2/1923 | Hughes . | |
| 1,520,647 | 12/1924 | Hennegan . | |
| 1,697,751 | 1/1929 | Blake . | |
| 1,793,348 | 2/1931 | Wood | 40/310 |
| 1,829,915 | 11/1931 | Wasser | 40/310 |
| 2,076,450 | 4/1937 | Doty . | |
| 2,110,981 | 3/1938 | Auslander . | |
| 2,111,129 | 3/1938 | Rittenhouse | 47/72 |
| 2,140,932 | 12/1938 | Avery | 206/423 |
| 2,171,835 | 9/1939 | Mackie . | |
| 2,209,778 | 7/1940 | Krasowski . | |
| 2,302,259 | 11/1942 | Rothfuss . | |
| 2,355,559 | 8/1944 | Renner . | |
| 2,440,569 | 4/1948 | Baldwin . | |
| 2,540,707 | 2/1951 | Beukelman | 206/423 |
| 2,606,106 | 8/1952 | Albertson . | |
| 2,827,217 | 3/1958 | Clement . | |
| 2,845,735 | 8/1958 | Werner . | |
| 2,884,741 | 5/1959 | Lange . | |
| 4,216,620 | 8/1980 | Weder . | |
| 4,914,860 | 4/1990 | Richardson . | |

FOREIGN PATENT DOCUMENTS

| | | | |
|---|---|---|---|
| 2213693A | 8/1989 | United Kingdom | 47/72 |

*Primary Examiner*—Ramon S. Britts
*Assistant Examiner*—Joanne C. Downs
*Attorney, Agent, or Firm*—Thomas I. Rozsa; Tony D. Chen

[57] ABSTRACT

The present invention is a reversible dual-purpose self-standing pot cover for covering a flowerpot or a plant pot. It first side is wrapped by a fabric material with decoration and the second side is wrapped by a fabric material with an uncovered central area used as a writing surface for writing messages. The reversible dual-purpose self-standing pot cover is placed around a flowerpot to enhance the pot image or it can be reversed to send a message to someone.

20 Claims, 1 Drawing Sheet

FIG. 1
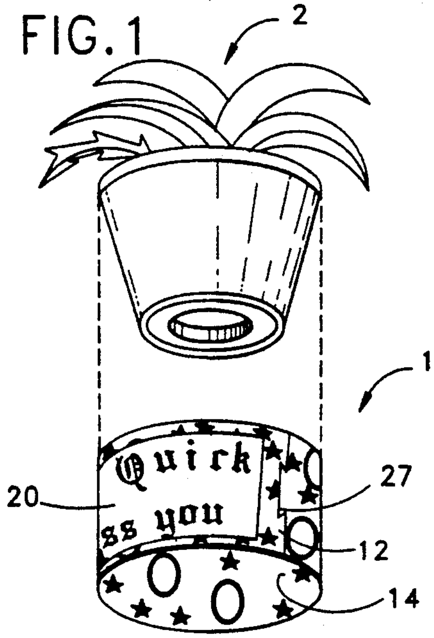
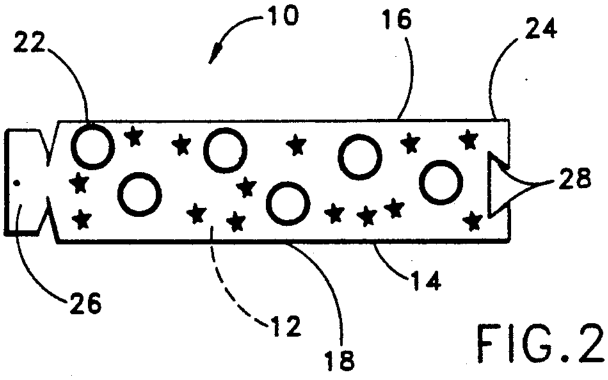
FIG. 2
FIG. 3
FIG. 4
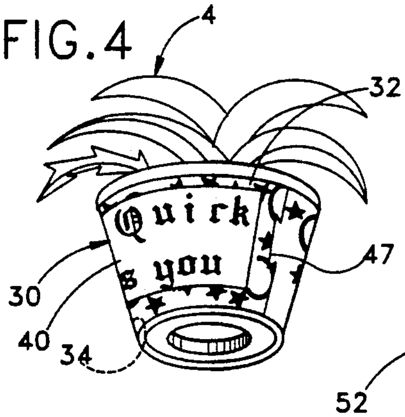
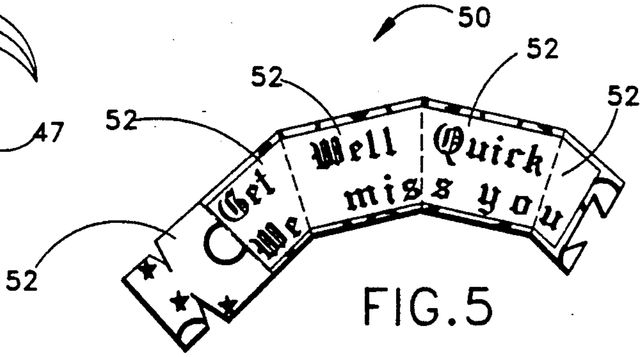
FIG. 5
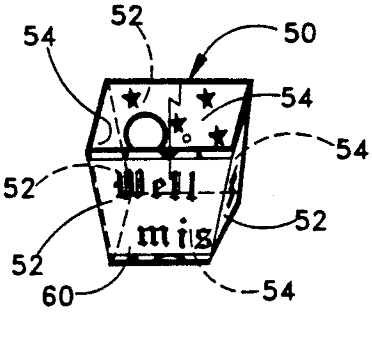
FIG. 6
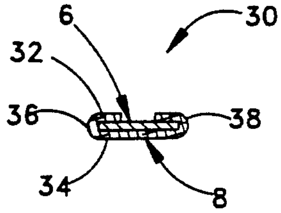
FIG. 7

REVERSIBLE DUAL-PURPOSE SELF-STANDING POT COVER

BACKGROUND OF THE INVENTION

1. Field of the Invention

The present invention relates generally to pot covers. In particular, the present invention relates to pot covers for interior flowers or plants.

2. Description of the Prior Art

Various devices for covering flower and plant pots are known in prior art. Generally, such devices are used to enhance the appearance of a flower or a plant pot. The following prior art references are relevant to the field of the present invention.

1. U.S. Pat. No. 4,914,860 issued to Richardson for "Flower Pot Cover" (hereafter the "Richardson Patent").

2. U.S. Pat. No. 4,216,620 issued to Weder et al. for "Flower Pot Wrap With Lace Pattern Edging" (hereafter the "Weder Patent").

3. U.S. Pat. No. 2,884,741 issued to Lange for "Flower Pot Cover" (hereafter the "Lange Patent").

4. U.S. Pat. No. 2,845,735 issued to Werner for "Flower-Pot Cover" (hereafter the "Werner Patent").

5. U.S. Pat. No. 2,827,217 issued to Clement for "Receptacle" (hereafter the "Clement Patent").

6. U.S. Pat. No. 2,606,106 issued to Albertson for "Flowerpot Cover" (hereafter the "Albertson Patent").

7. U.S. Pat. No. 2,440,569 issued to Baldwin for "Plant Pot Cover" (hereafter the "Baldwin Patent").

8. U.S. Pat. No. 2,355,559 issued to Renner for "Cover For Container" (hereafter the "Renner Patent").

9. U.S. Pat. No. 2,302,259 issued to Rothfuss for "Ornamental Cover For Flower Pots" (hereafter the "Rothfuss Patent").

10. U.S. Pat. No. 2,209,778 issued to Krasowski for "Decorative Covering For Flowerpots And The Like" (hereafter the "Krasowski Patent").

11. U.S. Pat. No. 2,171,835 issued to Mackie for "Flowerpot Cover" (hereafter the "Mackie Patent").

12. U.S. Pat. No. 2,152,648 issued to Jones for "Plant Container Covering" (hereafter the "Jones Patent").

13. U.S. Pat. No. 2,110,981 issued to Auslander for "Cover For Flowerpots And The Like" (hereafter the "Auslander Patent").

14. U.S. Pat. No. 2,076,450 issued to Doty for "Flowerpot Cover" (hereafter the "Doty Patent").

15. U.S. Pat. No. 1,697,751 issued to Blake for "Flowerpot Cover" (hereafter the "Blake Patent").

16. U.S. Pat. No. 1,520,647 issued to Hennecan for "Flowerpot Cover" (hereafter the "Hennecan Patent").

17. U.S. Pat. No. 1,446,563 issued to Hughes for "Decorative Covering For Flowerpots, Bouquets, And The Like" (hereafter the "Hughes Patent").

The Richardson Patent discloses a flower pot cover. The flowerpot cover is in the shape of an animal. It includes a cover and a bottom portion. The flowerpot is placed inside the bottom portion and the cover is used to enclose the flowerpot.

The Weder Patent discloses a flowerpot wrap with lace pattern edging. The flowerpot is wrapped within a metallic foil and a plastic film. The foil defines a lace pattern collar above the pot.

The Lange Patent discloses a flowerpot cover. It includes a circular horizontal bottom and a conical section.

The Werner Patent discloses a planar blank for a protective decorative cover for a flowerpot. The blank is in the shape of an arc and has only a one side decoration.

The Clement Patent discloses a receptacle for a flowerpot. It is a container for holding flowerpots.

The Albertson Patent discloses a cover for a flowerpot. It includes a blank of flexible sheet material. When the cover forms, it has a larger upper conical section and a smaller lower conical section. It is retained together by a strip at the ends of the blank.

The Baldwin Patent discloses a cover for a plant pot. The cover includes a thin sidewall and a flexible waterproof sack-like member. The cover is made of stretchable material which conforms to the pot. The sidewall does not have any decorations.

The Renner Patent discloses a cover for a container. It comprises of a plurality of superimposed transparent sheets. The sheets are fused together to surround the container.

The Rothfuss Patent discloses an ornamental cover for a flowerpot. The cover has shirr-stitching between the opposite edges of the cover. The stitching is made of an elastic thread.

The Krasowski Patent discloses a decorative covering for a flowerpot. The cover includes a sheet of flexible material and binding strips. The opposed end edges are attached by hook-shaped members securing the ends together.

The Mackie Patent discloses a flowerpot cover. It includes a tubular tapered cover member and an ornamental ribbon.

The Jones Patent discloses a cover for a plant container. The cover is wrapped around the container. The cover has two edges. One of the edges snugly encircles the top edge of the container and the other edge spirals about the container.

The Auslander Patent discloses a cover for a flowerpot. It includes a plurality of upright members formed with edges having apertures. A resilient material passes through the apertures to connect the upright members together.

The Doty Patent discloses a cover for a flowerpot. It includes a piece of sheet-like flexible fabric material and fasteners. The ends of the sheet are fastened together by a bendable pin laced back and forth through the ends.

The Blake Patent discloses a cover for a flowerpot. It includes a strip and pleats which is stitched transversely upon the cover to retain it together. The ends of the cover are disposed in an overlapping relationship and are held together by crimping the upper and the lower side edges together.

The Hennecan Patent discloses a cover for a flowerpot. The cover is fitted over a flowerpot and slits are provided to allow a strip of ribbon to be placed through and connected to the back.

The Hughes Patent discloses a decorative covering for flowerpots and bouquets. It includes a sheet of flexible material and binding strips adjacent the upper and lower edges.

It will be desirable to have a dual-purpose pot cover, a first side having decorations for enhancing the image of a flowerpot, and the second side for writing messages, without the cost of buying individual items.

SUMMARY OF THE INVENTION

The present invention is a reversible dual-purpose self-standing pot cover for a flowerpot or a plant pot. The reversible dual-purpose self-standing pot cover is placed around the flowerpot or the plant pot. It can be used with the first side displaying decorations or the second side displaying a message. The pot cover is used to enhance the image of a flowerpot or a plant pot.

It has been discovered, according to the present invention, that if the pot cover is reversible, it will provide a dual purpose pot cover, with the first side for enhancing the image of a pot and the second side for writing messages.

It has also been discovered, according to the present invention, that when the reversible dual-purpose self-standing pot cover is formed, it will provide a self-standing pot cover for covering flowerpots.

It has additionally been discovered, according to the present invention, that if the reversible dual-purpose self-standing pot cover has a locking mechanism, it will provide a means to retain the two elongated straight opposite edges together to form its cylindrical configuration.

It has further been discovered, according to the present invention, that if the reversible dual-purpose self-standing pot cover is made in different sizes, it will cover a wide variety of flowerpots.

It is therefore an object of the present invention to provide a reversible dual-purpose self-standing pot cover, so that the first side is used for decorating the pot cover and the second side is used for writing messages.

It is another object of the present invention to provide a locking mechanism for the reversible dual-purpose self-standing pot cover, so that the locking mechanism can retain the two elongated straight edges together to form its cylindrical configuration and also to provide a self-standing pot cover.

It is a further object of the present invention to provide a reversible dual-purpose self-standing pot cover in different sizes, so that it can cover a wide variety of shapes.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated:

FIG. 1 is a perspective view of a flowerpot and the present invention cylindrical shaped pot cover, displaying the second side with a writing surface.

FIG. 2 is a perspective view of the preferred embodiment of the present invention, displaying the first side.

FIG. 3 is a perspective view of an alternative embodiment of the present invention, displaying the second side.

FIG. 4 is a perspective view of the alternative embodiment of the present invention, forming a frustum shaped pot cover surrounding the flowerpot.

FIG. 5 is a perspective view of an another alternative embodiment of the present invention, displaying the second side.

FIG. 6 is a perspective view of the other alternative embodiment of the present invention forming a truncated pyramid shaped pot cover.

FIG. 7 is a cross-sectional view taken along line 7—7 of FIG. 3.

DESCRIPTION OF THE PREFERRED EMBODIMENT

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Referring to FIGS. 1 and 2, there is shown the preferred embodiment of the reversible dual-purpose self-standing pot cover 10 and a flowerpot 2. The pot cover 10 is generally an elongated rectangular shaped thin foldable card-board. It has two elongated straight opposite edges 16 and 18, a first narrow end 22, a second narrow end 24, an integral insert element 26 and a mating slot 28. The reversible dual-purpose self-standing pot cover 10 also includes a first side 14 and a second side 12. The first side 14 is completely decorated with artwork and the second side 12 is partially decorated with artwork except for a central area thereof to form a writing surface 20. The insert element 26 at the end of the first narrow end 22, when engaged with the mating slot 28 at the end of the second narrow end 24 forms the locking mechanism 27. The locking mechanism 27 will retain the cylindrical shaped configuration, as shown in FIG. 1. Once the reversible dual-purpose self-standing pot cover 10 is formed, the flowerpot 2 is placed within the hollow of the cylindrical shape pot cover.

By using this type of locking mechanism, it does not require any additional hardware to retain the cylindrical shape of the pot cover. It is emphasized that while this type of locking mechanism is the preferred embodiment, it is also within the spirit and scope of the present invention to have any multiplicity of such retaining means incorporated into the pot cover.

Referring to FIGS. 3 and 4, there is shown an alternative embodiment of the reversible dual-purpose self-standing pot cover 30 and a flowerpot 4. The pot cover 30 is generally a flange shaped thin foldable card-board with two elongated curved opposite edges 36 and 38, a first narrow end 42, a second narrow end 44, an integral insert element 46 and a mating slot 48. The reversible dual-purpose self-standing pot cover 30 also includes a first side 34 and a second side 32. The first side 34 is completely decorated with artwork and the second side 32 is partially decorated with artwork except for a central area thereof to form a writing surface 40. The insert element 46 at the end of the first narrow end 42, when engaged with the mating slot 48 at the end of the second narrow end 44 forms the locking mechanism 47. The locking mechanism 47 will retain the frustum shape, as shown in FIG. 4. Once the reversible dual-purpose self-standing pot cover 30 is formed, the flowerpot 4 is placed within the hollow of the frustum shape pot cover, as shown in FIG. 4. The pot cover 30 will conform to the flowerpot.

Referring to FIGS. 5 and 6, there is shown another alternative embodiment of the reversible dual-purpose self-standing pot cover 50. By having a prefolded series of integrally connected generally trapezoid shaped sections 52, the reversible dual-purpose sell-standing pot cover 50 can form a truncated pyramid shaped configuration, as shown in FIG. 6. The first side 54 is completely decorated with artwork and the second side 52 is partially decorated with artwork except for a central area thereof to form a writing surface 60.

It will be appreciated that the present invention is not limited to the shapes described above. It is emphasized that while the elongated rectangular shape is the preferred embodiment, it is also within the spirit and scope of the present invention to have any multiplicity of shapes. In addition, it will not be too hard for one skilled in the art to form any multiplicity of configurations.

Referring to FIG. 7, there is shown a cross-sectional view of the reversible dual-purpose self-standing pot cover 30. The construction of the reversible dual-purpose self-standing pot cover 30 consists of two constituent parts. The first piece is made of a flexible card-board 6 and the second piece is a fabric material 8. The fabric material 8 is wrapped around the two elongated opposite edges 36 and 38. The fabric material 8 completely covers the first side 34 which forms a decoration side, and the second side 32 is partially covered with the fabric material 8 except for a central area thereon to form a writing surface. The fabric material 8 is retained on the flexible cardboard 6 by using adhesive or other suitable means. It is noted that the elongated flexible card-board 6 may also be made of other material, such as thin plastic plate.

The present invention has many advantageous features including: (a) it provides a dual purpose; (2) it can be made in any different configuration desired, such as cylindrical or any shape; (3) it is made of inexpensive cardboard; (4) it can be wrapped with all types of fabric; and (5) it is inexpensive to manufacture.

Defined in detail, the present invention is a reversible dual-purpose self-standing pot cover, comprising: (a) a generally elongated rectangular shaped thin foldable cardboard member having two elongated straight opposite edges, a first narrow end and an opposite second narrow end, and a first side and an opposite second side; (b) an integral insert element at said first end of said cardboard member and a mating slot at said second end of said cardboard member is folded to form a circumferential sidewall which is self-standing and can be placed around a flowerpot as a pot cover; (c) a thin flexible piece of fabric member completely covering said first side of said cardboard member to form a decoration side of said pot cover, and wrapping around said two opposite edges of said cardboard member and partially covering said second side of said cardboard member except a central area thereof to form a message side of said pot cover, where the uncovered central area serves as a writing surface; and (d) adhesive means for affixing securely said fabric member to said cardboard member; (e) whereby said pot cover is reversible between its said message side and its said decoration side, where a message can be written on said writing surface and when the message is desired to be displayed, said cardboard member can be folded and its said two opposite ends interlocked such that said message side of said pot cover is exposed outwardly, and when said decoration side of said pot cover is desired to be displayed, said interlocking means can be released so that said cardboard member can be folded reversely and its said two opposite ends interlocked again such that said decoration side of said pot cover is exposed outwardly.

Defined broadly, the present invention is a reversible dual-purpose self-standing pot cover, comprising: (a) an elongated thin foldable cardboard member having two opposite sides and two opposite narrow ends; (b) means for releasibly interlocking said two opposite ends of said cardboard member when said cardboard member is folded to form a circumferential sidewall which is self-standing and can be placed around a flowerpot as a pot cover; (c) a thin flexible fabric member at least completely covering one of said two opposite sides of said cardboard member to form a decoration side of said pot cover; (d) another one of said two opposite sides of said cardboard member forming a message side of said pot cover with an uncovered area serving as a writing surface; and (e) means for securely affixing said fabric member to said cardboard member; (f) whereby said pot cover is reversible between its said message side and its said decoration side, where a message is desired to be displayed, said cardboard member can be folded and its said two opposite ends interlocked such that said message side of said pot cover is exposed outwardly, and when said decoration side of said pot cover is desired to be displayed, said interlocking means can be released so that said cardboard member can be folded reversely and its said two opposite ends interlocked again such that said decoration side of said pot cover is exposed outwardly.

Defined more broadly, the present invention is a reversible dual-purpose self-standing pot cover, comprising: (a) providing an elongated thin foldable cardboard member which has two opposite sides and two opposite narrow ends; (b) covering one of said two opposite ends of said cardboard member completely with a thin flexible fabric member to form a decoration side of a pot cover; (c) using another one of said two opposite sides of said cardboard member as a message side of said pot cover and reserving a central area thereof uncovered to serve as a writing surface; (d) when a message written on said writing surface is desired to be displayed, folding said cardboard member and releasibly interlocking its said two opposite ends such that said message side of said pot cover is exposed outwardly; and (e) when said decoration side of said pot cover is desired to be displayed, folding said cardboard member and releasibly interlocking its said two opposite ends such that said decoration side of said pot cover is exposed outwardly; (f) whereby said pot cover is reversible between its said message side and its said decoration side, by detaching said two opposite ends of said cardboard member, folding said cardboard member reversely, and releasibly interlocking its said two opposite ends again.

Of course the present invention is not intended to be restricted to any particular form or arrangement, or any specific embodiment disclosed herein, or any specific use, since the same may be modified in various particulars or relations without departing from the spirit or scope of the claimed invention hereinabove shown and described of which the apparatus shown is intended only for illustration and for disclosure of an operative embodiment and not to show all of the various forms or modification in which the present invention might be embodied or operated.

The present invention has been described in considerable detail in order to comply with the patent laws by providing full public disclosure of at least one of its forms. However, such detailed description is not intended in any way to limit the broad features or principles of the present invention, or the scope of patent monopoly to be granted.

What is claimed is:

1. A reversible dual-purpose self-standing pot cover, comprising:

a. a generally elongated rectangular shaped thin foldable cardboard member having two elongated straight opposite edges, a first narrow end and an opposite second narrow end, and a first side and an opposite second side;

b. an integral insert element at said first end of said cardboard member and a mating slot at said second end of said cardboard member folded to form a circumferential sidewall which is self-standing and can be placed around a flowerpot as a pot cover;

c. a thin flexible piece of fabric member completely covering said first side of said cardboard member to form a decoration side of said pot cover, and wrapping around said two opposite edges of said cardboard member and partially covering said second side of said cardboard member except a central area thereof to form a message side of side pot cover, where the uncovered central area serves as a writing surface; and d. adhesive means for affixing securely said fabric member to said cardboard member;

e. whereby said pot cover is reversible between its said message side and its said decoration side, where a message can be written on said writing surface and when the message is desired to be displayed, said cardboard member can be folded and its said two opposite ends interlocked such that said message side of said pot cover is exposed outwardly, and when said decoration side of said pot cover is desired to be displayed, said interlocking means can be released so that said cardboard member can be folded reversely and its said two opposite ends interlocked again such that said decoration side of said pot cover is exposed outwardly.

2. The pot cover as defined in claim 1 wherein said circumferential sidewall is generally a cylindrical shape.

3. The pot cover as defined in claim 1 wherein said circumferential sidewall is generally a trilateral prismatic shape.

4. The pot cover as defined in claim 1 wherein said circumferential sidewall is generally a quadrilateral prismatic shape.

5. The pot cover as defined in claim 1 wherein said circumferential sidewall is generally a multilateral prismatic shape.

6. A reversible dual-purpose self-standing pot cover, comprising:

a. an elongated thin foldable cardboard member having two opposite sides and two opposite narrow ends;

b. means for releasibly interlocking said two opposite ends of said cardboard member when said cardboard member is folded to form a circumferential sidewall which is self-standing and can be placed around a flowerpot as a pot cover;

c. a thin flexible fabric member at least completely covering one of said two opposite sides of said cardboard member to form a decoration side of said pot cover;

d. another one of said two opposite sides of said cardboard member forming a message side of said pot cover with an uncovered area serving as a writing surface; and e. means for securely affixing said fabric member to said cardboard member;

f. whereby said pot cover is reversible between its said message side and its said decoration side, where a message is desired to be displayed, said cardboard member can be folded and its said two opposite ends interlocked such that said message side of said pot cover is exposed outwardly, and when said decoration side of said pot cover is desired to be displayed, said interlocking means can be released so that side cardboard member can be folded reversely and its said two opposite ends interlocked again such that said decoration side of said pot cover is exposed outwardly.

7. The pot cover as defined in claim 6 wherein said interlocking means includes an integral insert element at one of said two opposite ends of said cardboard member and a mating slot at another one of said two opposite ends of said cardboard member.

8. The pot cover as defined in claim 6 wherein said means for affixing securely said fabric member to said cardboard member includes adhesive means.

9. The pot cover as defined in claim 6 wherein said elongated cardboard member is generally a rectangular shape.

10. The pot cover as defined in claim 6 wherein said circumferential sidewall is generally a cylindrical shape.

11. The pot cover as defined in claim 6 wherein said circumferential sidewall is generally a multilateral prismatic shape.

12. The pot cover as defined in claim 6 wherein said elongated cardboard member is generally a flange shape.

13. The pot cover as defined in claim 6 wherein said circumferential sidewall is generally a frustum shape.

14. The pot cover as defined in claim 6 wherein said elongated cardboard member comprises a series of integrally connected generally trapezoid shaped sections.

15. The pot cover as defined in claim 6 wherein said circumferential sidewall is generally a truncated pyramid shape.

16. A method of forming a reversible dual-purpose self-standing pot cover, comprising:

a. providing an elongated thin foldable cardboard member which has two opposite sides and two opposite narrow ends;

b. covering one of said two opposite ends of said cardboard member completely with a thin flexible fabric member to form a decoration side of a pot cover;

c. using another one of said two opposite sides of said cardboard member as a message side of said pot cover and reserving a central area thereof uncovered to serve as a writing surface;

d. when a message written on said writing surface is desired to be displayed, folding said cardboard member and releasibly interlocking its said two opposite ends such that said message side of said pot cover is exposed outwardly; and e. when said decoration side of said pot cover is desired to be displayed, folding said cardboard member and releasibly interlocking its said two opposite ends such that said decoration side of said pot cover is exposed outwardly;

f. whereby said pot cover is reversible between its said message side and its said decoration side, by detaching said two opposite ends of said cardboard member, folding said cardboard member reversely, and releasibly interlocking its said two opposite ends again.

17. The method as defined in claim 16 further comprising the step of prefolding said cardboard member into a series of integrally connected sections.

18. The method as defined in claim 16 further comprising the steps of forming an integral insert element at one of said two opposite ends of said cardboard member and cutting a mating slot at another one of said two opposite ends of said cardboard member so that said two opposite ends of said cardboard member can be releasibly interlocked together when said cardboard member is folded.

19. The method as defined in claim 16 further comprising the step of affixing said fabric member to said cardboard member with adhesive.

20. The method as defined in claim 16 further comprising the step of preprinting messages on said writing surface of said pot cover.

* * * * *